(12) United States Patent
Mindnich et al.

(10) Patent No.: US 9,619,514 B2
(45) Date of Patent: Apr. 11, 2017

(54) INTEGRATION OF OPTIMIZATION AND EXECUTION OF RELATIONAL CALCULATION MODELS INTO SQL LAYER

(71) Applicants: Tobias Mindnich, Sulzbach (DE); Jeong Ae Han, Seoul (KR); Johannes Merx, Heidelberg (DE); Christoph Weyerhaeuser, Heidelberg (DE); Yongsik Yoon, Walldorf (DE); Sung Heun Wi, Seoul (KR)

(72) Inventors: Tobias Mindnich, Sulzbach (DE); Jeong Ae Han, Seoul (KR); Johannes Merx, Heidelberg (DE); Christoph Weyerhaeuser, Heidelberg (DE); Yongsik Yoon, Walldorf (DE); Sung Heun Wi, Seoul (KR)

(73) Assignee: SAP SE, Walldorf (DE)

( * ) Notice: Subject to any disclaimer, the term of this patent is extended or adjusted under 35 U.S.C. 154(b) by 477 days.

(21) Appl. No.: 14/307,092

(22) Filed: Jun. 17, 2014

(65) Prior Publication Data

US 2015/0363463 A1    Dec. 17, 2015

(51) Int. Cl.
*G06F 17/30* (2006.01)

(52) U.S. Cl.
CPC .............................. *G06F 17/30442* (2013.01)

(58) Field of Classification Search
None
See application file for complete search history.

(56) References Cited

U.S. PATENT DOCUMENTS

2012/0109934 A1*  5/2012  Weyerhaeuser .. G06F 17/30463
                                                707/713

* cited by examiner

*Primary Examiner* — Anh Tai Tran
(74) *Attorney, Agent, or Firm* — Mintz Levin Cohn Ferris Glovsky and Popeo, P.C.

(57) ABSTRACT

A query is received by a database server from a remote application server. The query is associated with a calculation scenario that defines a data flow model that includes one or more nodes that each define one or more operations for execution by a calculation engine on the database server. Thereafter, the database server instantiates a runtime model of the calculation scenario based on the nodes of the instantiated calculation scenario. Subsequently, one or more of the nodes are identified as being convertible into a relational database format. These nodes are then used to form a container node. An execution plan of the runtime model of the calculation scenario including the container node is built that is executed by the database server to result in a data set which is provided by the database server to the application server.

20 Claims, 6 Drawing Sheets

INTEGRATION OF OPTIMIZATION AND EXECUTION OF RELATIONAL CALCULATION MODELS INTO SQL LAYER

TECHNICAL FIELD

The subject matter described herein relates to combining multiple independent optimizers by optimizing, identifying, converting and combining calculation engine operators into algebra trees which can be further optimized by a SQL optimizer.

BACKGROUND

Some database platforms utilize calculation models to express complex data flows and calculations. These calculation models can take the form of a directed acyclic graph (DAGs). Calculation models can be advantageous, in contrast to standard SQL, because of enhanced functionality such as efficient currency conversion and the possibility of non-relational operation nodes. Before a calculation model is executed, the DAG can be optimized to push down filters and non-relational operation nodes can be optimized. However, for relational optimizations, such as join re-ordering, a SQL optimizer can be used for a more efficient execution plan.

SUMMARY

In one aspect, a query is received by a database server from a remote application server. The query is associated with a calculation scenario that defines a data flow model that includes one or more nodes that each define one or more operations for execution by a calculation engine on the database server. Thereafter, the database server instantiates a runtime model of the calculation scenario based on the nodes of the instantiated calculation scenario. Subsequently, the instantiated calculation scenario is optimized by identifying one or more of the nodes as being convertible into a relational database format and adding the identified nodes to form a container node. An execution plan of the runtime model of the optimized calculation scenario is built that is based on operations defined by the nodes of the instantiated scenario including the container node. The database server then executes the operations defined by the execution plan to result in a data set which is provided by the database server to the application server.

In another aspect, a query is received by a database server from a remote application server. The query is associated with a calculation scenario that defines a data flow model that includes one or more nodes that each define one or more operations for execution by a calculation engine on the database server. Thereafter, the database server instantiates a runtime model of the calculation scenario based on the nodes of the instantiated calculation scenario. Subsequently, the instantiated calculation scenario is optimized by identifying one or more of the nodes as being convertible into a relational database format and adding the identified nodes to form a container node. An execution plan of the runtime model of the optimized calculation scenario is built that is based on operations defined by the nodes of the instantiated scenario including the container node. The database server then executes the operations defined by the execution plan to result in a data set. The executing converts contents of the container node into a relational optimizer graph, optimizes the relational optimizer graph, builds and executes a sub-execution plan using the optimized relational optimizer graph that returns an intermediate result for consumption by the execution plan. The resulting data set can then be provided by the database server to the application server.

In some variations, the instantiated calculation scenario can be optimized using a calculation engine optimizer prior to building the execution plan. The execution plan is built using a plan builder. The execution plan can include one or several container nodes including relational operators. During execution of the plan, the relational operators of each container node are converted into a relational optimizer graph which is optimized by a SQL optimizer Afterwards out of the optimized graph structure, a SQL execution plan is created and executed. This SQL execution plan is a sub-plan of the execution plan of the calculation scenario.

At least a portion of paths and/or attributes defined by the calculation scenario can, in some implementations, not be required to respond to the query. In such cases, the instantiated calculation scenario can omit the paths and attributes defined by the calculation scenario that are not required to respond to the query.

At least one of the calculation nodes can filter results obtained from the database server. At least one of the calculation nodes can sort results obtained from the database server.

The calculation scenario can be instantiated in a calculation engine layer by a calculation engine. The calculation engine layer can interact with a physical table pool and a logical layer. The physical table pool can include physical tables containing data to be queried, and the logical layer can define a logical metamodel joining at least a portion of the physical tables in the physical table pool. The calculation engine can invoke an SQL processor for executing set operations.

An input for each calculation node can include one or more of: a physical index, a join index, an OLAP index, and another calculation node. Some or all calculation nodes can have at least one output table that is used to generate the data set. At least one calculation node can consume an output table of another calculation node.

The query can be forwarded to a calculation node in the calculation scenario that is identified as a default node if the query does not specify a calculation node at which the query should be executed. The calculation scenario can include database metadata.

The database can be a column oriented database. The database can be an in-memory database.

Computer program products are also described that comprise non-transitory computer readable media storing instructions, which when executed by one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, peer-to-peer wireless coupling, a local area network, a wide area network, a wired network, or the like), via a direct connection between one or more of the multiple computing systems, etc.

The subject matter described herein provides many advantages. For example, the current subject matter enables optimization and execution of relational models into an SQL layer which, in turn, obviates the need for data model designers to rewrite calculation models with SQL. Furthermore, the current subject matter obviates the need to re-implement optimizer logical from a SQL optimizer to a calculation engine optimizer and vice versa. Still further, the current subject matter provides for a best possible query optimization for mixed calculation models, that is, calculation models that are partly relational expressible with SQL and using calculation engine specific operators.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
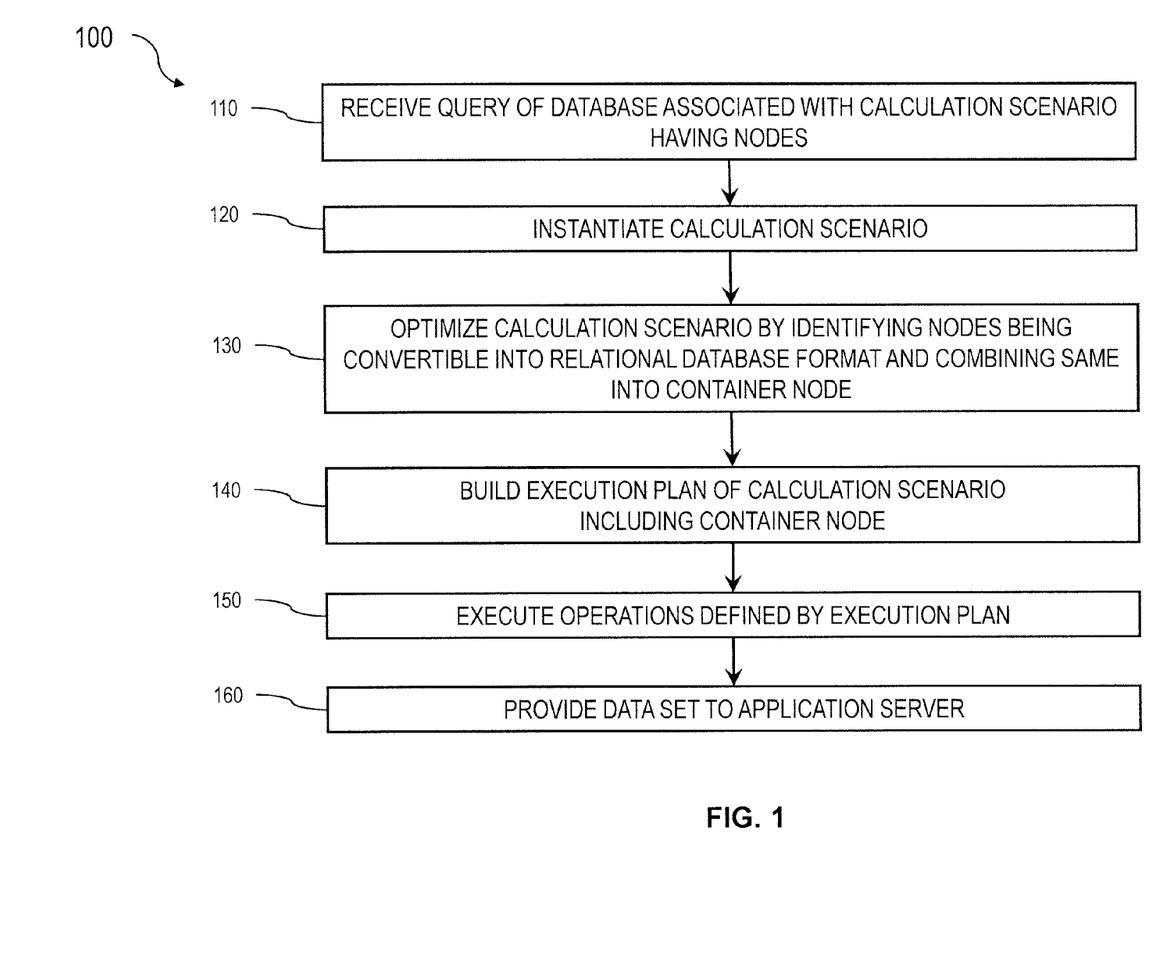
FIG. 1 is a first process flow diagram illustrating integration of optimization and execution of relational calculation scenarios into a relational database layer.

FIG. 1 is a diagram 100 in which, at 110, a query is received by a database server from a remote application server. The query is associated with a calculation scenario that defines a data flow model that includes one or more nodes that each define one or more operations for execution by a calculation engine on the database server. Thereafter, at 120, the database server instantiates a runtime model of the calculation scenario based on the nodes of the instantiated calculation scenario. Subsequently, at 130, the calculation scenario is optimized. As part of such optimization, two or more of the nodes are identified as being convertible into a relational optimizer graph. These nodes are then combined to form a container node. An execution plan of the runtime model of the calculation scenario is built, at 140, that is based on operations defined by the nodes of the instantiated scenario including the container node. The database server then, at 150, executes the operations defined by the execution plan to result in a data set. During execution of the calculation operators (all non-relational operators+the container operators) for each container node, the content of the container node (i.e., the relational operator graph) is converted into the relational optimizer format. After conversion, the relational optimizer graph is optimized and a sub execution plan is built and executed which returns an intermediate result which is further consumed by the calculation operator plan. The results can later be provided, at 160 by the database server to the application server.

Figure 2:
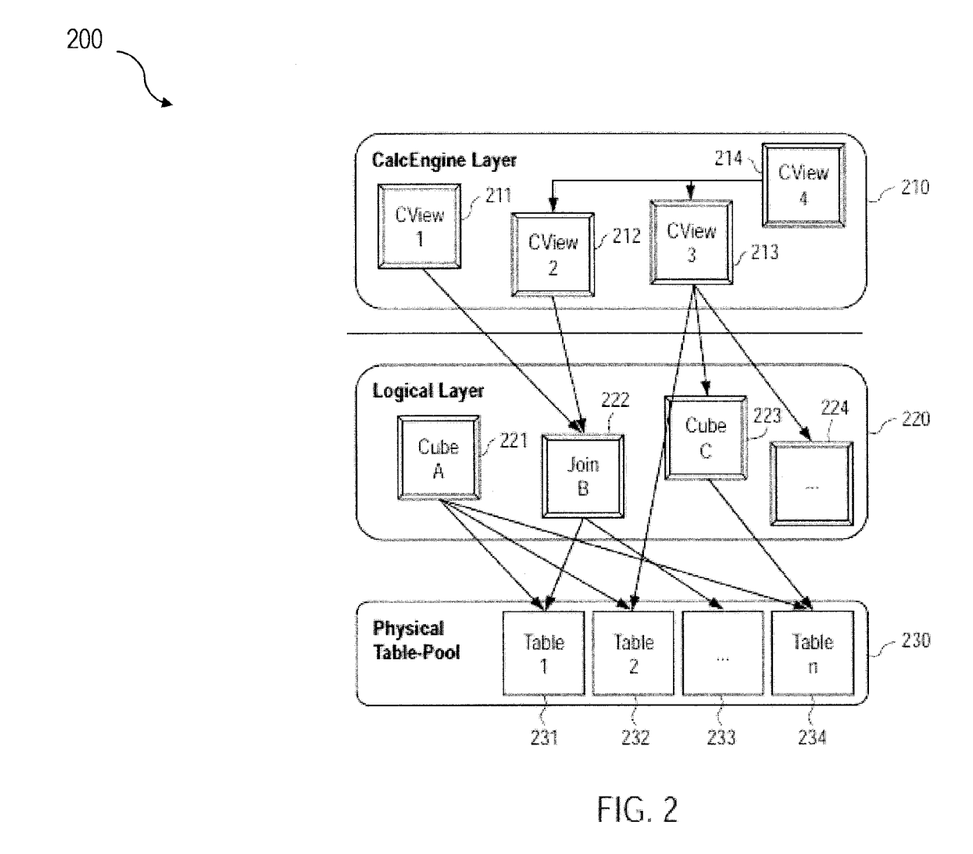
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes. A calculation node as used herein represents a operation such as a projection, aggregation, join, union, minus, intersection, dynamic split and the like. Additionally, as described below, in addition to a specified operation, calculation nodes can sometimes be enhanced by filtering and/or sorting criteria. In some implementations, calculated attributes can also be added to calculation nodes.

In calculation scenarios, two different representations can be provided. First, a stored ("pure") calculation scenario in which all possible attributes are given. Second, an instantiated/executed model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Further details regarding calculation engine architecture and calculation scenarios can be found in U.S. Pat. No. 8,195,643, the contents of which are hereby fully incorporated by reference.

Figure 3:
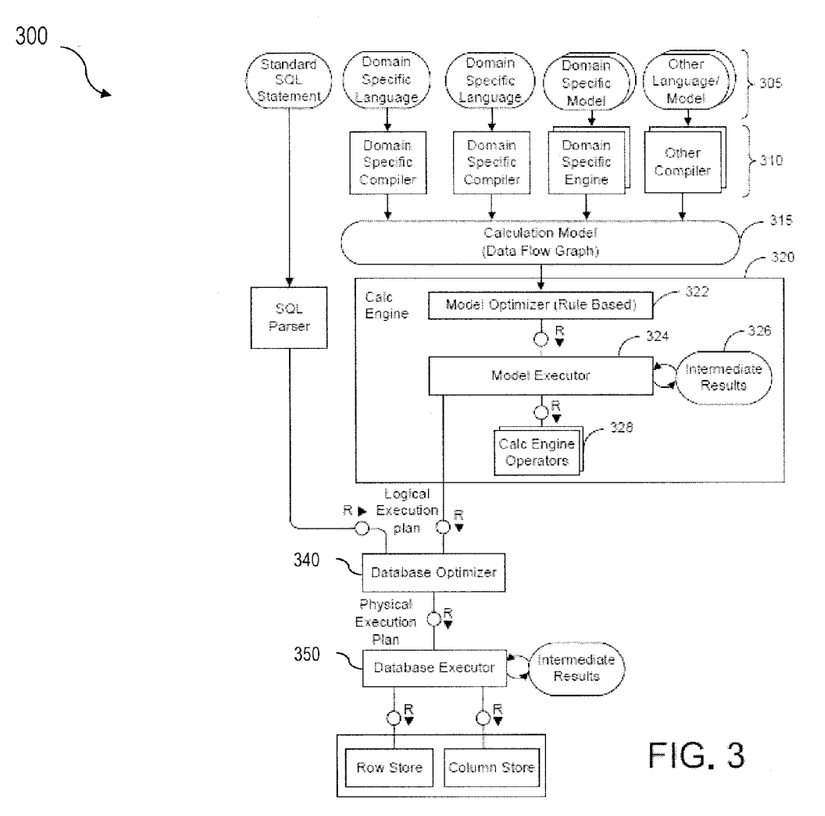
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data. Described herein is how the split operator can be enhanced from static split to resource based dynamic split.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, the combination of multiple aggregation and join operations into one node or identifying and combining relational operators into a container node which can be later on further optimized by the relational optimizer (i.e., the database optimizer 34). The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Also, the container nodes can be translated into relational optimizer graphs which are further optimization by a database optimizer 340 (sometimes referred to as a SQL optimizer) and eventually executed as sub-plans of the calculation scenario.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

The calculation engine 320 typically does not behave in a relational manner. The main reason for this is the instantiation process. The instantiation process can transform a stored calculation model 315 to an executed calculation model 315 based on a query on top of a calculation view which is a (catalog) column view referencing one specific node of a stored calculation model 315. Therefore, the instantiation process can combine the query and the stored calculation model and build the executed calculation model.

The main difference between a relational view or SQL with subselects and a calculation model is that the projection list in a relational view is stable also if another SQL statement is stacked on top whereas in a calculation model the projection list of each calculation node in the calculation model is depending on the projection list of the query or the parent calculation node(s).

With a calculation model 315, a user can provide a set of attributes/columns on each calculation node that can be used by the next calculation node or the query. If attributes/columns are projected in a query or on the parent calculation node, then just a subset of these requested attributes/columns can be considered in the executed calculation model.

Figure 4:
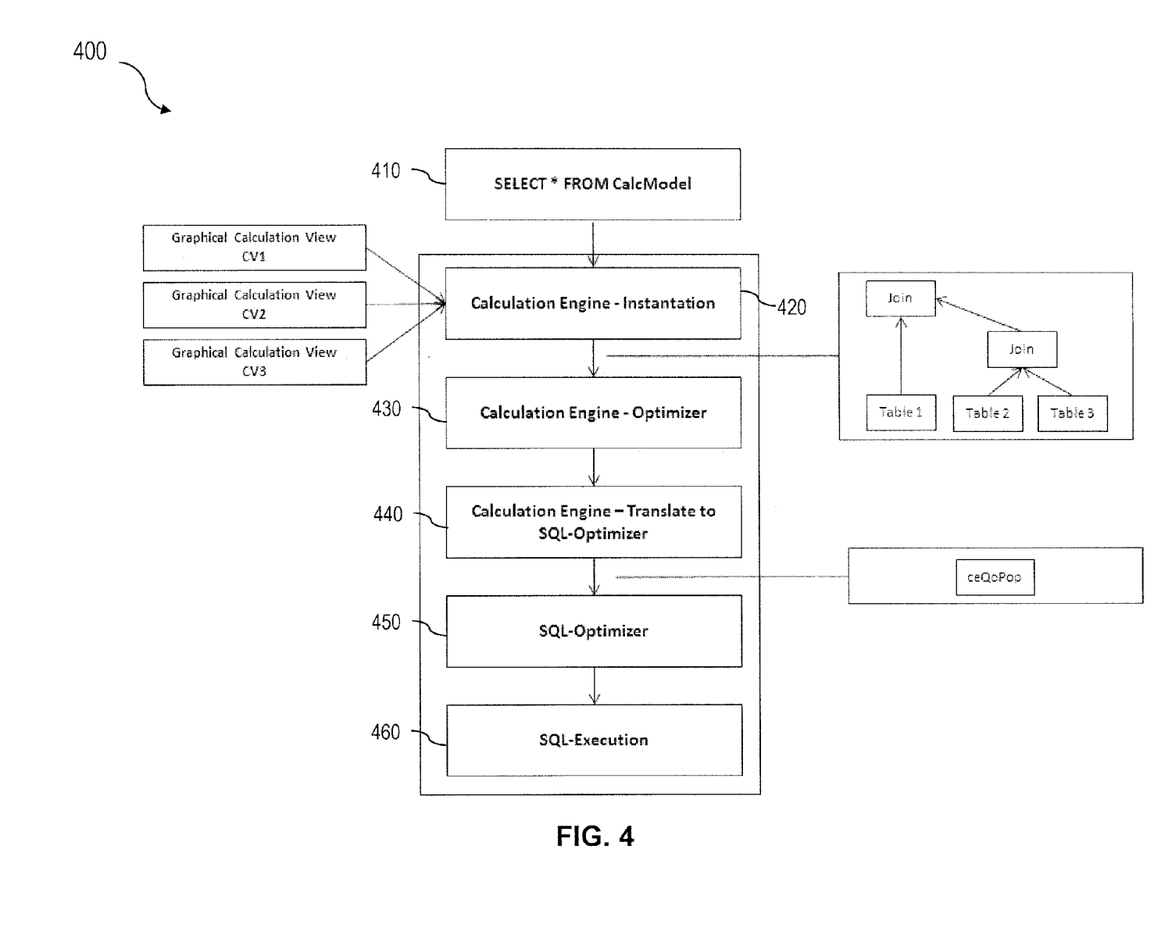
FIG. 4 is a logical diagram illustrating integration of optimization and execution of relational calculation scenarios into a relational database layer.

With reference to diagram 400 of FIG. 4, the calculation engine optimizer 322 can hand-over a logical query execution plan (query optimization tree or simply QO-Tree) to the SQL-optimizer 340 by direct translation into its data structures. In particular, a query is received, at 410, that is associated with a calculation scenario/calculation model. The calculation scenario can be represented in various format such as JSON format (the format we use internally) or in XML. Sometimes we also use the term "stored model". The calculation scenario describes in a generic way how to calculate something (e.g. a tax report, etc.).

The calculation engine 320 then instantiates the calculation scenario at 420 using a plurality of calculation views. Calculation views are used, in this regard, because a calculation scenario cannot be accessed via SQL because it is not a catalog object. To be able to query a calculation scenario, the calculation views can act as an entrance point from the SQL layer and which points to a specific node within the calculation scenario. As illustrated in FIG. 4, it is possible to have multiple calculation views on a calculation scenario pointing to the same calculation node or different calculation nodes within the scenario. One calculation view always point to only one calculation node inside the calculation scenario. Stated differently, in order to get data out of the calculation scenario, a corresponding calculation view is queried via SQL (e.g. "SELECT A, B, C FROM CAL-C_VIEW1"). The query (with its projection list "A, B, C") can be combined with the calculation scenario. Thus, the calculation model can be reduced to the attributes (A, B, C) which are requested with the query. Everything else is removed. Thus the calculation scenario becomes query specific. The result of the instantiation is sometimes referred to as the runtime model.

Thereafter, at 430, the runtime model (produced by the instantiation) is further optimized. These optimizations are applied directly on the runtime model and thus the result of the optimization process is a further reduced runtime model.

Thereafter, calculation engine optimizer 322 (as part of translating to a database/SQL optimizer at 440) can implement optimization rules that mark calculation nodes that are executable by SQL optimizer 340 and later condenses (sub-) graphs of marked calculation nodes into one container node. From a calculation engine 320 perspective, the query optimization graph (Qo-graph) can be characterized as a sub-plan that is wrapped by an operator referred to herein as QoOperation. When a calculation model containing such an operation is executed by the calculation engine 320, the Qo-Operation can convert all nodes directly into the data structure of the SQL-optimizer 340 and invokes for further optimization (at 450) and execution the SQL-optimizer (at 460).

For a calculation model, the calculation engine optimizer 322 can traverse the nodes of a calculation model to check if each node is relational convertible. A container node can then be generated by combining one or more nodes that were identified as being relational convertible. Thereafter, the calculation model is expressed in a manner that can be executed first by the calculation engine 320 and the container node(s) can later executed by the database executor 350.

Figure 5:
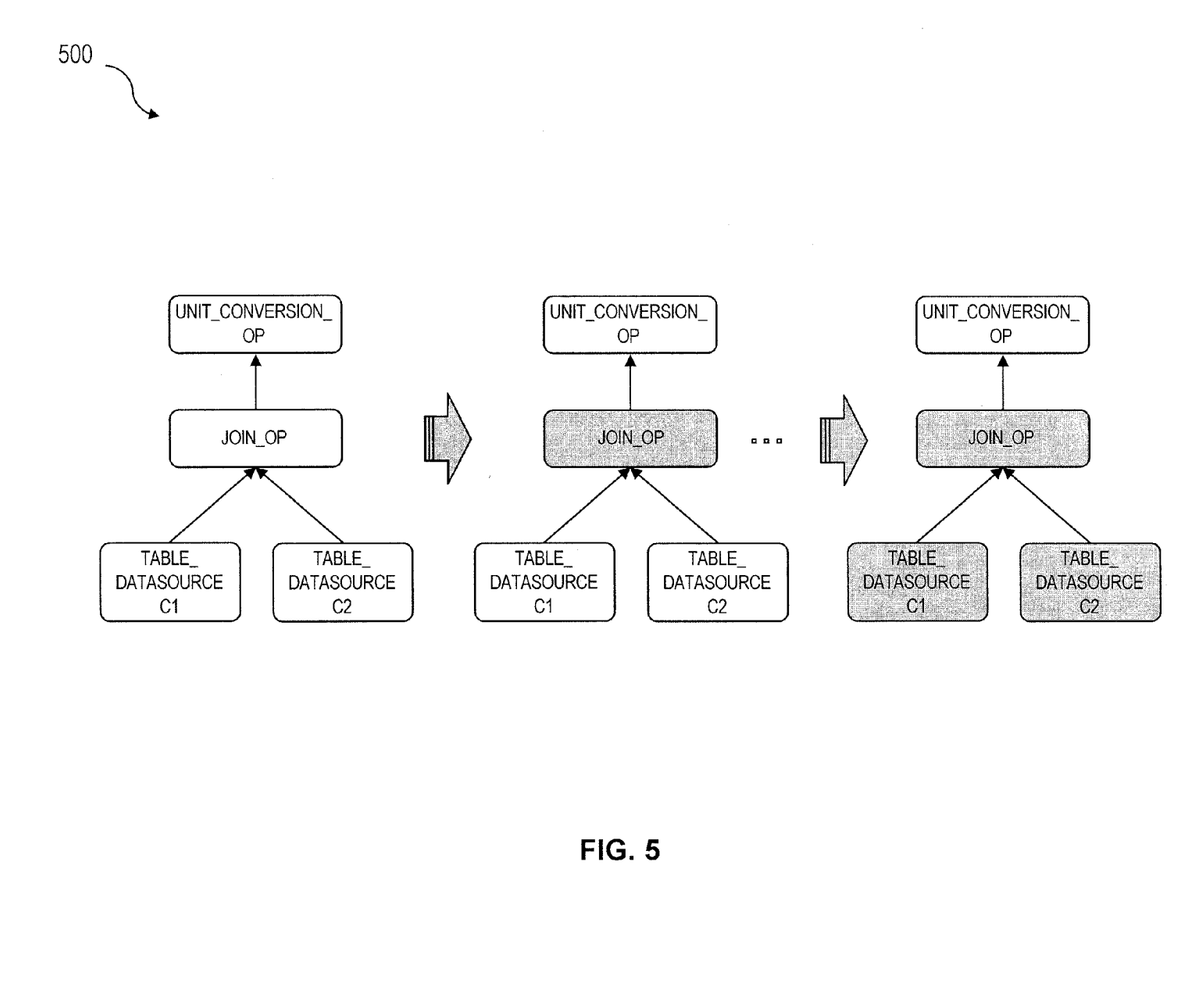
FIG. 5 is a diagram illustrating identification of nodes to form a container node.
Figure 6:
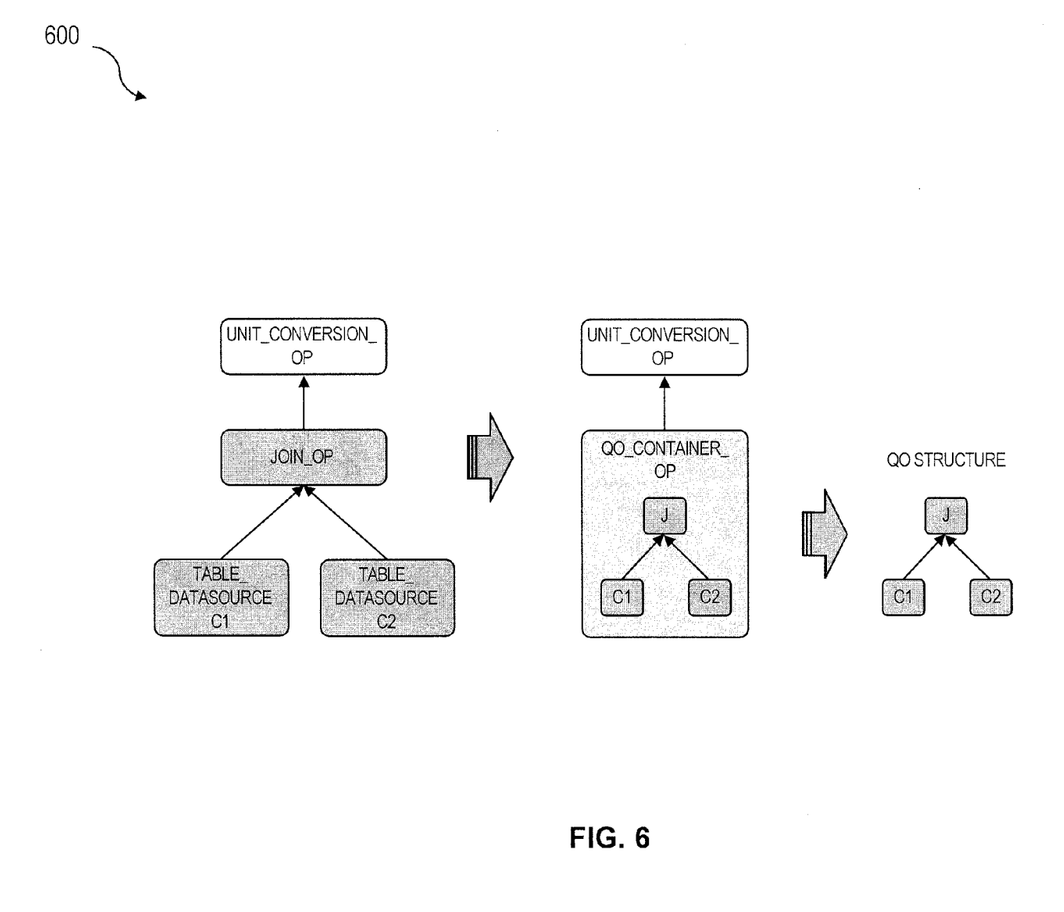
FIG. 6 is a diagram illustrating formation of a container node.

Diagram 500 of FIG. 5 illustrates a mixed calculation model (i.e., a calculation model that is partly relational expressible with SQL and partly using calculation engine (non-relational) operators. In particular, FIG. 5 shows a process of flagging operator nodes as being convertible into a relational database format, namely the nodes relating to the join of tables from data sources C1 and C2. Diagram 600 of FIG. 6 shows the combination of connected and convertible nodes and the consolidation in one calculation engine query optimizer operator structure.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
   receiving, by a database server from a remote application server, a query associated with a calculation scenario that defines a data flow model that includes one or more nodes that each define one or more operations for execution by a calculation engine on the database server;
   instantiating, by the database server, a runtime model of the calculation scenario based on the nodes of the calculation scenario;
   optimizing the instantiated calculation scenario by identifying one or more of the nodes as being convertible into a relational database format and adding the identified nodes to form a container node;
   building an execution plan of the runtime model of the calculation scenario based on operations defined by the nodes of the instantiated scenario including the container node;
   executing, by the database server, the operations defined by the execution plan to result in a data set; and
   providing, by the database server to the application server, the data set.

2. A method as in claim 1, wherein the instantiated calculation scenario is optimized using a calculation engine optimizer prior to building the execution plan.

3. A method as in claim 1, wherein the execution plan is built using a relational database optimizer.

4. A method as in claim 3, wherein the relational database optimizer converts the nodes into an execution plan.

5. A method as in claim 1, wherein at least a portion of paths and/or attributes defined by the calculation scenario are not required to respond to the query, and wherein the instantiated calculation scenario omits the paths and attributes defined by the calculation scenario that are not required to respond to the query.

6. A method as in claim 1, wherein at least one of the calculation nodes filters results obtained from the database server.

7. A method as in claim 1, wherein at least one of the calculation nodes sorts results obtained from the database server.

8. A method as in claim 1, wherein the calculation scenario is instantiated in a calculation engine layer by the calculation engine.

9. A method as in claim 8, wherein the calculation engine layer interacts with a physical table pool and a logical layer, the physical table pool comprising physical tables containing data to be queried, and the logical layer defining a logical metamodel joining at least a portion of the physical tables in the physical table pool.

10. A method as in claim 9, wherein the calculation engine invokes an SQL processor for executing set operations.

11. A method as in claim 1, wherein an input for each calculation node comprises one or more of: a physical index, a join index, an OLAP index, and another calculation node.

12. A method as in claim 1, wherein the executing comprises:
    forwarding the query to a calculation node in the calculation scenario that is identified as a default node if the query does not specify a calculation node at which the query should be executed.

13. A non-transitory computer program product storing instructions which, when executed by at least one data processor forming part of at least one computing device, result in operations comprising:
    receiving, by a database server from a remote application server, a query associated with a calculation scenario that defines a data flow model that includes one or more nodes that each define one or more operations for execution by a calculation engine on the database server;
    instantiating, by the database server, a runtime model of the calculation scenario based on the nodes of the calculation scenario;
    optimizing the instantiated calculation scenario by identifying one or more of the nodes as being convertible into a relational database format and adding the identified nodes to form a container node;
    building an execution plan of the runtime model of the calculation scenario based on operations defined by the nodes of the instantiated scenario including the container node;
    executing, by the database server, the operations defined by the execution plan to result in a data set; and
    providing, by the database server to the application server, the data set.

14. A computer program product as in claim 13, wherein the instantiated calculation scenario is optimized using a calculation engine optimizer prior to building the execution plan.

15. A computer program product as in claim 13, wherein the execution plan is built using a relational database optimizer.

16. A computer program product as in claim 15, wherein the relational database optimizer converts the nodes into an execution plan.

17. A method comprising:
    receiving, by a database server from a remote application server, a query associated with a calculation scenario that defines a data flow model that includes one or more nodes that each define one or more operations for execution by a calculation engine on the database server;
    instantiating, by the database server, a runtime model of the calculation scenario based on the nodes of the calculation scenario;
    optimizing the instantiated calculation scenario by identifying one or more of the nodes as being convertible into a relational database format and adding the identified nodes to form a container node;
    building an execution plan of the runtime model of the calculation scenario based on operations defined by the nodes of the instantiated scenario including the container node;

executing, by the database server, the operations defined by the execution plan to result in a data set, wherein the executing converts contents of the container node into a relational optimizer graph, optimizes the relational optimizer graph, builds and executes a sub-execution plan using the optimized relational optimizer graph that returns an intermediate result for consumption by the execution plan; and providing, by the database server to the application server, the data set.

18. A method as in claim 17, wherein the instantiated calculation scenario is optimized using a calculation engine optimizer prior to building the execution plan.

19. A method as in claim 17, wherein the execution plan is built using a relational database optimizer.

20. A method as in claim 19, wherein the relational database optimizer converts the nodes into an execution plan.

* * * * *